United States Patent [19]
Mori

[11] 4,268,714
[45] May 19, 1981

[54] SHIELDED WIRE

[75] Inventor: Akinori Mori, Kanuma, Japan

[73] Assignee: Sumitomo Electric Industries, Ltd., Osaka, Japan

[21] Appl. No.: 39,475

[22] Filed: May 16, 1979

[51] Int. Cl.³ .............................................. H01B 7/18
[52] U.S. Cl. .................................... 174/108; 174/36; 174/109; 174/115
[58] Field of Search ................... 174/115, 108, 109, 36

[56] References Cited

U.S. PATENT DOCUMENTS

| | | | |
|---|---|---|---|
| 1,948,616 | 2/1934 | Fischer | 174/109 X |
| 2,045,104 | 6/1936 | Rosch | 174/109 X |
| 2,852,423 | 9/1958 | Bassett | 174/109 X |
| 3,474,186 | 10/1969 | Hale | 174/109 X |
| 3,927,247 | 12/1975 | Timmons | 174/115 X |
| 4,041,237 | 8/1977 | Stine | 174/115 X |
| 4,157,518 | 6/1979 | McCarthy | 174/115 X |

Primary Examiner—Richard R. Kucia
Attorney, Agent, or Firm—Sughrue, Rothwell, Mion, Zinn and Macpeak

[57] ABSTRACT

A shielded wire having a central core and an insulation layer coated thereover. A shield layer separates the insulation layer from a ground wire and is formed by a composite tape having a metal surface and an adhesive surface. The metal surface is longitudinally folded to cover a portion of the adhesive surface and the tape is helically wound with the folded surface on the outside to form alternate helical patterns of the metal and adhesion layers. A sheath covers the shield layer and the ground wire and is bonded to the adhesive layer while the ground wire is in contact with the outside metal layer. The inside metal surface forms the shield.

8 Claims, 9 Drawing Figures

SHIELDED WIRE

BACKGROUND OF THE INVENTION

This invention relates to an improvement in shielded wire for use in audio equipment, and of wires having outer conductors such as coaxial cable (shield wire and coaxial cable are hereinafter referred to "shielded wire").

Typical types of the conventional shielded wires are shown in FIGS. 1(a) and 1(b), wherein FIGS. 1(a) and 1(b) show a single core type and double core type shielded wire, respectively.

Reference character C shows a coaxial core which comprises a central conductor 1, a plastic insulation layer 2 made of polyethylene-ethylene copolymer, or foamed materials thereof, and a shield layer 3. The shield layer 3 has a plurality of soft-copper wires or tin plated soft copper wires, each longitudinally disposed about the plastic insulation layer 2.

A ground wire 4 made of soft copper wire or soft copper wire plated with tin is longitudinally spliced along the coaxial core C or is helically wound thereabout with a relatively large pitch. Finally a plastic sheath 5 made of polyethylene or polyvinylchloride is formed by extrusion to cover the coaxial core C and the grounded wire 4.

Such types of shielded wires exhibit desirable electric characteristics, since each of the cores is shielded and the ground wire 4 is closely contacted with the shield layer 3. However, since the shield layer 3 is composed of a plurality of thin lines each longitudinally disposed along the insulating layer, the insulating shielded wire is costly, and long periods of time are required to deal with the thin lines in finishing the end portion of the shielded wire. Therefore, demands have been made for a shielded wire wherein the end portion thereof may be easily constructed.

In order to meet this demand, another type of conventional shielded wire has been provided as shown in FIGS. 2(a) and 2(b), wherein FIGS. 2(a) and 2(b) show single core type, and double core type shielded wires, respectively. In FIGS. 2(a) and 2(b), like parts and components are designated by the same reference numerals as those shown in FIGS. 1(a) and 1(b).

According to these shielded wires, a tubular shield layer 23 is provided. The shielded layer is made of a composite tape, i.e., plastic materials, such as polyethylene-ethylene copolymer, are laminated over an electroconductive metal tape made of copper or aluminum. The composite tape is longitudinally spliced or wound over the coaxial core and the ground wire to internally position the metal tape. Since the metal tape contacts the ground wire 4, while the laminated plastic tape is externally positioned, the laminated plastic tape is thermally melt-bonded with a plastic sheath 5 during extrusion thereof.

According to these types of shielded wires, since the shield layer 23 is melt-bonded with the plastic sheath 5, the shield layer 23 is easily removed by removing the sheath 5 during the end finishing step. However, complete shielding of each of the conductors is not obtainable and hence the practical application of wires of this type has not been achieved.

SUMMARY OF THE INVENTION

It is therefore an object of this invention to overcome the above-mentioned drawbacks and to provide an improved shielded wire which permits complete shielding of conductors and easy end finishing.

This and other objects according to this invention are attained by providing composite tapes. One side of the composite tape is formed with a tape made of materials which permit good adhesion with plastic material, while the other side thereof is formed with a metal tape. The composite tape is longitudinally folded with the folded outer surface being metal tape.

The folded composite tape is helically wound around the coaxial core, to provide an alternating helical pattern of a folded outer metal tape and inner material having good adhesion with plastic material.

A ground wire is provided on the helically wound composite tape, and a plastic sheath is extruded thereover. Since the ground wire contacts the folded metal tape, the complete shielding of the coaxial core is obtainable. Also, since the extruded plastic sheath is in contact with the material having good adhesion with plastic, the shield layer made of composite tape can be easily removed together with the removal of the sheath during end finishing.

These and other objects of this invention will become apparent from the description of the drawings and the preferred embodiments which follow.

DETAILED DESCRIPTION OF THE INVENTION

Figure 1A:
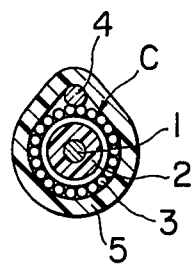
FIGS. 1(a) and 1(b) are cross sectional views of the conventional single core type and double core type shielded wires, respectively.
Figure 1B:
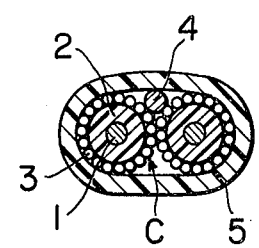
Figure 2A:
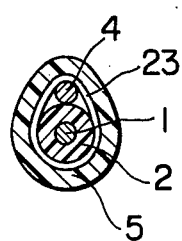
FIGS. 2(a) and 2(b) are cross sectional views of another type of conventional single core type and double core type shielded wires, respectively.
Figure 2B:
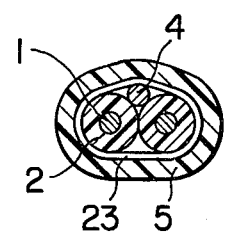
Figure 3A:
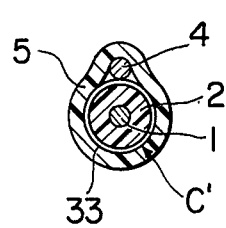
FIGS. 3(a) and 3(b) are cross sectional views of single and double core type shielded wires according to this invention.
Figure 3B:
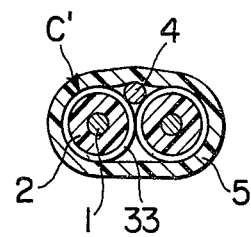

Referring now to FIGS. 3(a) and 3(b), a plastic-insulation layer 2 is coated on an inner conductor 1. The plastic insulation layer 2 is made of polyethylene-ethylene copolymer, teflon, vinyl chloride or foamed materials thereof similar to conventional shielded wires. According to this invention, a shield layer 33 of composite tape is provided over the insulation layer 2. One side of the composite tape 33 is formed with a tape having good adhesion with plastic materials while the other side thereof is formed with a metal tape made of aluminum or copper.

Figure 4:
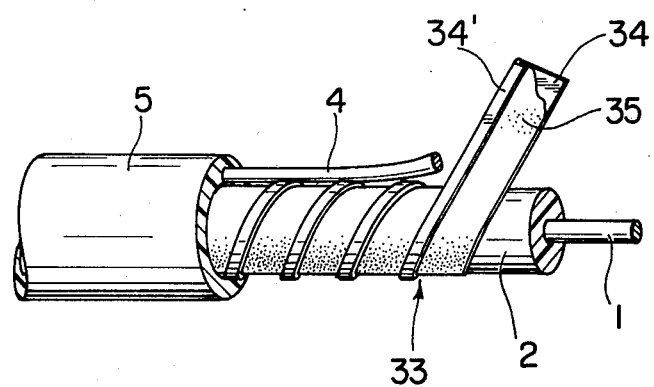
FIG. 4 is a perspective view of a single core type shielded wire according to this invention.

As shown in FIG. 4, the composite tape 33 is folded with the outer surface being metal tape 34' and adhesive layer 35. The longitudinal edge portion 34 is made to alternately provide a helical pattern of the metal portion 34' and the tape portion 35 having a good adhesion with plastics when helically winding the folded composite tape 33 around the insulation layer 2.

Therefore the internal surface of the tubular shield layer 33 is entirely the metal layer, while at the outer surface thereof, the folded metal portion and the tape 35 are obtained.

A ground wire 4 is longitudinally disposed on the shield layer 33 or helically wound with relatively large pitch to contact the metal portion 34'.

Figure 5A:
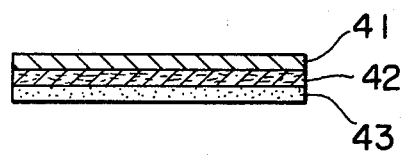
FIGS. 5(a) and 5(b) show cross sectional views of examples of composite tapes according to this invention.
Figure 5B:
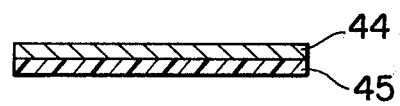

Reference numeral 5 designates a plastic sheath made of polyethylene or polyvinylchloride. The sheath 5 is formed by extrusion to thereby ensure sufficient bonding with the tape portion 35 of the composite tape 33, since the tape 35 has good adhesion with plastic materials. FIGS. 5(a) and 5(b) show examples of composite tapes used as a shield layer according to this invention. FIG. 5(a) and FIG. 5(b) show composite tapes of three and two layers, respectively.

In FIG. 5(a) reference numeral 41 designates a metal layer made of aluminum or copper, 42 a base layer made of polyester or paper, and 43 a layer having good adhesion with plastic material. The metal layer 41 is in the form of metal tape or metal foil adhered to the base layer 42. Alternatively, the metal layer 41 is formed by metal evaporation. Further, the layer 43 is made of any material generally used having good adhesion with plastic materials.

In FIG. 5(b), reference numeral 44 designates a metal layer made of aluminum or copper and 45 a plastic layer mainly made of ethylene-polymer or copolymer having thermally melt bondable characteristics. The plastic layer may be a plastic tape laminated to the metal layer.

With this structure, according to this invention, since each of the cores is completely covered with a metal surface of the shield layer, sufficient shielding is realized, and since the grounded wire is contacted with the externally folded metal portion, the metal surface of the shield layer can be completely grounded. The end portion of the ground wire of the wire is grounded thereat to thereby provide a sufficient shielding effect.

Further, since the layer having good adhesion properties with plastic materials is bonded to the plastic sheath, the shield layer together with the sheath can be peeled off, to thereby easily achieve end finishing.

While the invention has been described in detail and with reference to specific embodiments thereof it will be apparent to one skilled in the art that various changes and modifications can be made therein without departing from the spirit and scope thereof.

What is claimed is:

1. In a shielded wire including at least one central core, and insulation layer coated thereover, the improvement comprising; a shield layer helically wound around said insulation layer, a ground wire positioned along the outer surface of said shield layer and a sheath covering said shield layer and said ground wire, said shield layer comprising a composite tape having on one side a layer having good adhesion properties with plastic materials, and having on the other side a metal layer, said composite tape being longitudinally folded with a portion of said metal layer covering a portion of said adhesion layer, and such folded composite tape being helically wound over said insulation layer such that the inner surface consists of only said metal layer, and such that the outer surface consists of a helically disposed pattern of the folded metal portion and said layer having good adhesion properties with plastics, said ground wire being in contact with said folded metal portion.

2. The shielded wire of claim 1 wherein said composite tape comprises a base layer of polyester tape, and said metal layer is a metal tape formed on one said of said base layer and adhesive material layer having good adhesion properties with plastic is coated on the other side of said base layer.

3. The shielded wire of claim 1, wherein said composite tape comprises a central paper tape, a metal tape formed on one side of said paper tape, and an adhesive material layer having good adhesion properties with plastic coated on the other side of said paper tape.

4. The shielded wire of claim 1, wherein said composite tape comprises a central paper layer, a metal layer evaporated on one side of said central layer, and an adhesive material layer having good adhesion properties with plastic materials coated on the other side of said central layer.

5. The shielded wire of claim 1, wherein said composite tape comprises a plastic tape laminated on one side of said metal layer, said plastic tape having thermally melt bondable characteristic.

6. The shielded wire of claim 1 wherein said composite tape comprises a plastic central tape, a metal layer evaporated on one side of said central tape and an adhesive material layer having good adhesion properties with plastic materials coated on the other side of said central tape.

7. The shielded wire of claims 1, 2, 3, 4, 5 or 6 wherein said metal layer is aluminum or copper.

8. The shielded wire of claims, 1, 2, 3, 4, 5 or 6 wherein said adhesive material layer is an ethylene-polymer or a copolymer.

* * * * *